ns Patent [19]

Thompson

[11] 3,963,849
[45] June 15, 1976

[54] FIREPROOF PRODUCT USING MAGNESIUM OXYCHLORIDE CEMENT

[75] Inventor: Henry Clark Thompson, Saratoga, Calif.

[73] Assignee: Thompson Chemicals, Inc., Palo Alto, Calif.

[22] Filed: Sept. 17, 1973

[21] Appl. No.: 397,835

Related U.S. Application Data

[60] Division of Ser. No. 194,557, Nov. 1, 1971, Pat. No. 3,778,304, which is a continuation-in-part of Ser. No. 811,616, March 28, 1969, abandoned, which is a continuation-in-part of Ser. No. 589,808, Oct. 27, 1966, abandoned.

[52] U.S. Cl. ........................ 428/182; 106/15 FP; 252/8.1; 260/2.5 FP; 260/2.5 AJ; 427/244; 428/184; 428/313; 428/314; 428/316; 428/318; 428/423; 428/426; 428/432; 428/537; 428/539; 428/920; 428/921

[51] Int. Cl.² ...................... B32B 3/28; B32B 5/18; B32B 17/00

[58] Field of Search ........... 161/159, 133, 192, 182, 161/403; 252/8.1; 106/87, 106, , 15 FP, 403; 117/138.8 D, 138, 98, 143 B, 116, 126 GF, 169; 260/2.5 FP, 2.5 AJ; 428/313, 314, 316, 182, 184, 318, 289, 426, 423, 432, 537, 539, 920, 921, 389

[56] References Cited
UNITED STATES PATENTS

| 735,335 | 8/1903 | Bird | 161/403 |
|---|---|---|---|
| 1,372,118 | 3/1921 | Collier | 162/153 |
| 1,429,451 | 9/1922 | Pease | 106/108 |
| 1,500,207 | 7/1924 | Shaw | 162/184 |
| 1,965,538 | 7/1934 | Stewart | 106/87 |
| 2,200,850 | 5/1940 | Mirenentino | 117/98 UX |
| 2,598,980 | 6/1952 | Denning | 106/88 |
| 2,702,753 | 2/1955 | Dickey | 106/106 |
| 3,013,901 | 12/1961 | Bugosh | 117/98 UX |
| 3,050,427 | 8/1962 | Slayter | 161/403 |
| 3,133,830 | 5/1964 | Jochinke | 117/137 |
| 3,522,069 | 7/1970 | Checko | 252/8.1 |
| 3,573,941 | 4/1971 | Edwards | 106/106 |

FOREIGN PATENTS OR APPLICATIONS

| 964,569 | 7/1964 | United Kingdom |

*Primary Examiner*—William J. Van Balen
*Assistant Examiner*—Ellis P. Robinson
*Attorney, Agent, or Firm*—Limbach, Limbach & Sutton

[57] ABSTRACT

A method of making a foamed fireproof product of magnesium oxychloride cement and the resulting product. A porous substrate is impregnated with a foaming mixture of magnesium chloride, magnesium oxide, and frothing agent in water. The mixture hardens with small voids throughout the porous substrate, thus providing a fireproof product of low density. The foamed product may be formed in a mold with fibrous elements inroduced into the foaming mixture. The fireproof products of relatively low density are particularly valuable for building and construction purposes. Magnesium powder is the preferred frothing agent which, in combination with a surfactant, induces a large volume of small bubbles that remain in the composition as it is set.

7 Claims, No Drawings

FIREPROOF PRODUCT USING MAGNESIUM OXYCHLORIDE CEMENT

CROSS-REFERENCE TO RELATED APPLICATIONS

This application is a division of application Ser. No. 194,557, filed Nov. 1, 1971, now U.S. Pat. No. 3,778,304 which is a continuation-in-part of application Ser. No. 811,616, filed Mar. 28, 1969, which in turn is a continuation-in-part of application Ser. No. 589,808, filed Oct. 27, 1966, both now abandoned.

BACKGROUND OF THE INVENTION

This invention relates to a process of fireproofing and the resultant fireproof product. More particularly, it relates to fireproofing with foamed magnesium oxychloride cement.

Fireproofing of porous organic materials such as insulating board, fiberboard, and the like has long been a difficult problem. Most chemicals used for fireproofing are expensive in the amounts required, so that the economies of fiberboard are lost in preparation of the commercial fireproof product. Moreover, many of the materials used for "fireproofing" are in fact simply flame retardants, which resist the spread of flames and extinguish the fire by the release of chlorine gas or other extinguishing material. However, fire retardant and flame retardant materials do not prevent the burning of the organic constituents of the porous substrates. In many cases, smoke still is given off through the burning of the cellulose fibers or other organic materials often with the result that severe smoke damage is still possible even though open flames do not break out.

Materials which have layers of fireproof materials over burnable organic materials, such as gypsum board, also suffer shortcomings. Gypsum board is not suitable for exterior use because of severe sensitivity to water. In addition, the paper backing in gypsum board is burnable.

Materials like asbestos-cement board are fireproof, but they are so expensive and so dense that they have not achieved the wide commercial acceptance possible with low-cost materials.

Magnesium oxychloride cement has been known for many years as a flooring material. However, because of its density and lack of porosity, it has not been widely used in other applications. It has previously been suggested to introduce porosity into magnesium oxychloride cement in U.S. Pat. No. 1,429,451 by the intermixing of cork or other light material into the cement and thereafter heating to partially decompose the cork particles. Still, the product of this patent is so dense that it has not achieved acceptance in the building and construction trades for walls, roofing, etc.

It has been suggested to make building boards and roofing material from magnesium oxychloride cement in U.S. Pat. No. 1,372,118 by forming magnesium oxychloride cement in a foraminous support. However, the product obtained is so dense and heavy that its usefulness is limited.

A less dense board is described in U.S. Pat. No. 1,500,207 where a magnesium oxychloride cement surface resembling ornamental stone is coated on a fiberboard. However, the cement is only on the surface and fails to thoroughly wet all the fibers in order to render them fireproof.

Porous magnesium oxychloride cement is disclosed in U.S. Pat. No. 1,965,538. However, this patent does not relate to fireproofing of burnable products.

U.S. Pat. No. 2,702,753 relates a foamed magnesium oxychloride tile having certain other ingredients. However, the magnesium oxychloride is not intended to fireproof other burnable materials.

U.S. Pat. No. 3,050,427 shows the use of fibrous glass in a binder. Of the binders listed in this patent, magnesium oxychloride cement is suggested as a possibility. However, the patent does not relate to fireproofing with foamed magnesium oxychloride cement.

SUMMARY OF THE INVENTION AND OBJECTS

This invention relates to relatively low density burnable materials which have been rendered non-burnable by the even distribution, throughout the burnable material, of foamed magnesium oxychloride cement. The even distribution of the cement may be accomplished by impregnating a porous substrate with a frothing mixture of the cement of this invention. The cement is foamed by the presence of a frothing agent which produces gas bubbles.

It is an object of this invention to provide an inexpensive, fireproof porous material having high strength properties and low density.

It is a further object of this invention to provide an improved process of manufacturing low density fireproof materials.

These and other objects of the invention will appear from the following description in which the preferred embodiments of the invention have been set forth in detail.

A DESCRIPTION OF THE PREFERRED EMBODIMENT

Magnesium oxychloride cement (sorel cement) is prepared by the reaction of magnesium chloride, magnesium oxide and water. The literature defines the reaction according to two net equations:

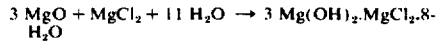

$$3\ MgO + MgCl_2 + 11\ H_2O \rightarrow 3\ Mg(OH)_2 \cdot MgCl_2 \cdot 8H_2O$$

or

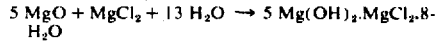

$$5\ MgO + MgCl_2 + 13\ H_2O \rightarrow 5\ Mg(OH)_2 \cdot MgCl_2 \cdot 8H_2O$$

Magnesium oxychloride cement, before it has set, may be made to froth with the addition of frothing agent. By adding a frothing agent during the initial reaction period of the oxychloride cement a continuing froth is obtained which may be impregnated in porous materials. The frothing agent continues to form bubbles in the magnesium oxychloride cement within the porous material until the initial set of the cement takes place, at which time the bubbles are frozen into a low density fireproof product.

In preparing magnesium oxychloride cement, I prefer to add water to $MgCl_2 \cdot 6H_2O$ to form a mixture having a specific gravity of 22° Baume. In practice, this is approximately a 1:1 ratio with water. The specific gravity is important and should not exceed the range of 21.5° and 22.5° Baume where $MgCl_2 \cdot 6H_2O$ is used. About 4¼ pounds of magnesium chloride is added to water to make a gallon of liquid at 22° Baume. It follows that the range of 21.5° and 22.5° Baume is achieved by roughly the addition of 4 to 5 pounds of magnesium chloride with water to make a gallon. In practice, it is convenient to purchase solutions of magnesium chloride which are commercially available at about 36° Baume. The desired specific gravity may be achieved simply by the addition of water.

Where other magnesium chloride hydrates are used or where small amounts of the magnesium chloride are substituted with other cement forming materials (such as magnesium sulfate), the specific gravity may vary slightly beyond the above specified range. Ordinarly, no more than 2 or 3 per cent by weight of the total cement composition of magnesium sulfate should be included, since the water resistance properties are altered and the bubble size and degree of frothing are changed where greater amounts are included.

Magnesium oxide is added to the mixture of magnesium chloride in water to commence the reaction to form magnesium oxychloride cement. It is essential to have between 5 and 6½ pounds of magnesium oxide added per gallon of magnesium chloride solution to form a satisfactory cement.

The ratio of magnesium oxide to magnesium chloride is critical for the purposes of this invention. If significantly less than 5 pounds or more than 6½ pounds of magnesium oxide is added per gallon of magnesium chloride solution at 22° Baume, the strength properties of the resulting product are seriously diminished. That is, because of the low density of the foamed magnesium oxychloride cement, insufficient strength remains in the foamed product for commercial purposes if less than 5 pounds or more than 6½ pounds magnesium chloride is mixed per gallon of 22° Baume magnesium chloride. Since 22° Baume magnesium chloride has approximately 4.25 pounds of magnesium chloride in it, it is convenient to use the ratio of magnesium oxide to magnesium chloride. The preferred embodiment is a ratio of about 5¼ pounds magnesium oxide per 4¼ pounds of magnesium chloride, or a ratio of 1.23. The preferred range of magnesium oxide to magnesium chloride is about 1.23 to about 1.42.

However, since most magnesium chloride used in commercial practice of the invention is purchased in liquid form, the foregoing critical range of 5 pounds to 6½ pounds magnesium oxide per gallon of magnesium chloride at 22° Baume is a useful measure.

In practice, it is convenient to maintain a 22° Baume solution of magnesium chloride and water as a liquid component separate from the dry powder which is added to the liquid to commence formation of the cement. The dry powder may include appropriate fillers or solid additives as desired. Substantial amounts of fillers, may be included such as powdered limestone, marble dust, silica flour, and magnesium carbonate, depending upon the density of the final product desired. In molded roofing panels, for example, it is preferred to add 1½ parts insoluble filler per part of magnesium oxide powder. A combination of fillers may be used, such as marble dust in major amount, combined with silica flour and a small portion of pigment.

The magnesium oxychloride cement begins the initial set in about two hours. The first stage of setting is concluded in 3 or 4 hours after mixing. Thereafter, the cement continues to harden for a considerable period of time, much like other cements. With faster setting cement, such as is preferred with production molding applications, the initial set may commence in 30 minutes and the pieces removed from the mold in two hours. The cement will not be completely set for 24 hours.

The preferred frothing agent is powdered magnesium, which reacts with the oxychloride cement to continuously produce small bubbles. The precise chemistry of the reaction is not understood, but it is believed that the reaction gives off hydrogen gas. It is known that the powdered magnesium continues to generate gas bubbles until it is consumed. The mere entrainment of air bubbles is not satisfactory because the air invariably escapes to the atmosphere before the cement is set. Moreover, entrained air cannot generally be forced into the pores of a porous substrate. That is, when a liquid having air entrained therein is applied to a porous fiberboard or cellulose foam, for example, the porous material will sift out the entrained bubbles while only the liquid impregnates the porous material, making a dense product. On the other hand, by frothing the magnesium oxychloride cement with an internal foaming agent, bubble formation continues until the cement sets. It continues to form bubbles within the pores of the porous substrate so that a low density honeycombed product is obtained that is still fireproof.

In the case of impregnating a polyurethane foam, continued foaming within the pores permits control of the density of the final product. Thus, a foam having specific dimensions, for example an acoustic ceiling tile, can be varied in density according to the amount of froth retained in the pores. If the cement were not frothing, it would simply drain from the foam before setting.

In order to control the size of the bubbles generated by the reaction of the foaming agent and the magnesium oxychloride cement, I prefer to include a small amount of surfactant. Inasmuch as magnesium oxychloride cement system is basic, the surfactant should be anionic, although it is believed that certain non-ionic surfactants are also suitable. The preferred detergent is a surfactant known as Rohm & Haas "S-100", defined by the manufacturer as isoctyl phenoxy polyethoxy ethanol containing 10 mols ethylene oxide. Other surfactants, such as GAF 5360, said to be a nonylphenoxypoly(ethyleneoxy)ethanol, or "Duponol ME" a fatty alcohol sulfate, are also highly satisfactory. The surfactant serves to control not only the size of the bubbles but also the amount.

Depending upon the particular surfactant, approximately one-half percent may be added based on the weight of the cement mixture. When smaller amounts of detergent or surface active agents are employed the amount of bubbles and the size of the bubbles is accordingly reduced. The surfactants vary greatly in ability to produce bubbles, so the weight of added surfactant must depend upon the material used. The range is generally from 0.01 to 1% of the weight of the mixture.

While the surfactant controls the size and amount of bubbles, it does not in itself contribute gas bubbles. In other words, the surfactant controls whether many small bubbles or few large bubbles will be produced by the frothing agent in the cement. In order to increase frothing, I have discovered that the addition of a small amount of lactic acid renders the froth much more reactive. Where vigorous foaming is desirable, I prefer to add about 0.1% lactic acid (based on the weight of the mixture) to the aqueous magnesium chloride component. When magnesium is the frothing agent added to the magnesium oxide component, a vigorous reaction commences upon mixing the components.

Lactic acid is believed to react with magnesium powder, which in turn reacts with the magnesium chloride. Frothing is increased about fourfold by the addition of 0.1% lactic acid. This increase in frothing may permit a decrease in the amount of magnesium required. Moreover the lactic acid serves as a cure control in that the reaction is exothermic. By increasing the temperature the time of curing the cement is reduced. Whereas normal curing of magnesium oxychloride cement takes about 2 hours for the initial set, the addition of a small quantity of lactic acid can reduce this time to less than 1 hour. Shortening of the curing time is important where the frothing mixture is introduced in the drying sequence of an existing line, as in the case of fireproofing fiberboard. The normal drying and compression period in making fiberboard is relatively short, so cure control by lactic acid permits flexibility in accommodating operation of existing capital equipment. In other applications, such as forming molded products, the higher temperature may not be desirable, so lactic acid may be omitted.

The frothing agent, such as powdered magnesium, may be added at any time after mixing of the cement ingredients and before the initial setting. In fact, the frothing agent may be combined with the dry magnesium oxide and packaged and stored. Then, when the magnesium oxide is added to the magnesium chloride in water, the mixture immediately begins to froth as well as to react to form a magnesium oxychloride cement. When powdered magnesium is the frothing agent, it is preferably added in the amount of about 0.1% or less of the weight of the cement. It has been found that magnesium in an amount between 0.05 and 2.0% of the weight of the cement may be added to give satisfactory frothing.

The surfactant is conveniently added along with the powdered magnesium, although it may be added separately. Also, the surfactant may be packaged and stored with the magnesium oxide and powdered cement to make a simple, two-part recipe which simply requires the addition of water.

When the frothing combination of magnesium chloride, magnesium oxide, powdered magnesium, detergent and water is prepared, it is ready for coating, impregnating, laminating, or molding. These steps must take place before the initial set commences. In the absence of any additives, magnesium oxychloride cement sets about 120 minutes after the ingredients are mixed when ordinary commercial grades of calcined magnesium oxide are used. However, where calcining of the magnesium oxide takes place at a lower temperature and under appropriate conditions, the initial cure of the cement may be commenced much sooner. For most purposes, a 40 minute cure is highly satisfactory since it permits thorough impregnation and working of the product before the initial set and still does not require undue periods of waiting for curing during the processng step.

Insoluble fillers may be added where desired. For example, insluble calcium carbonate, such as powdered limestone or marble dust, silica flour, magnesium carbonate, and other insoluble materials may be introduced. Ordinarily, soluble salts should be avoided because they can be leached out and reduce the strength of the foamed cement.

Magnesium oxychloride cement is at least four times as strong as Portland cement so that products fireproofed with oxychloride cement according to the present invention retain substantial strength along with low density. Moreover, Portland cement is moisture absorbent, while magnesium oxychloride is not. These properties permit utility in aircraft, for example, for soundproofing and insulation. The froth may be impregnated in a variety of porous and normally burnable substrates, such as fiberboard or foam products. Polyurethane foams, for example, ordinarily are readily burnable. Such foams may be rendered fireproof, however, by the addition of relatively small amounts of the magnesium oxychloride cement froth. The froth may also be combined with materials not thought to be destroyed by flame, such as glass fibers. Chopped glass fibers are within the contemplation of the word "burnable" herein.

Generally, at least 2 percent, based on the weight of the substrate, of the cement froth should be retained upon impregnation in a porous substrate. The fireproofing qualities are marginal when less than 2 percent of the cement is retained. Even below 2 percent, however, some flame resistance can be obtained. The greater the amount of retained cement above 2 percent, the greater the strength of the impregnated product. Beyond about 40 percent cement, based on the weight of the substrate, the density becomes so great that the substrate tends to become simply a filler in a cast cement product. Beyond 40 percent, the strength of the product is not substantially improved while density is increased. Consequently, I prefer to add between 2 and 40 percent cement, based on the weight of the substrate of coating. Where molded products are made with the cement, considerably more cement may be used, with the porous substrate being merely a core for strength and resiliency.

The process herein described is conveniently adaptable to fireproofing flammable fiberboard during its manufacture. Fiberboard is generally produced by either mechanically or chemically preparing fiber which is broken down by working to separate the fibers. Prepared pulp is made into boards in any convenient manner, such as on a cylindrical Oliver board forming machine or on a Fourdrinier machine. The formed mats are dewatered and compressed, cut and dried. By impregnating with cement before the mats are compressed, the froth is easily introduced into the mat. Thereafter, the frothing continues during the drying cycle until the cement sets. Only a small amount of cement (e.g. 2% based on the weight of the board) is necessary to fireproof the fiberboard which is compressed from an open mat about 2 inches thick to fiberboard only ⅝ inch thick, for example. The bubbles enable the cement to remain in the fiberboard during the compression step of making the fiberboard.

Since the cement is water resistant as well as fireproof, it is generally unnecessary to add wax or other sizing materials which are conventionally added to improve water resistance of fiberboard. The magnesium oxychloride cement also improves the resistance of porous substrates to insects and microorganisms.

EXAMPLE 1

In the preparation of the froth, 19¼ pounds of magnesium chloride were added to 4¼ gallons of water. The specific gravity was measured and additional magnesium chloride was added to adjust the specific gravity to 22° Baume. The combined total makes about 5 gallons. 200 grams of lactic acid were added to the aqueous mixture. Magnesium oxide was then measured in an amount equal to 5.5 pounds magnesium oxide to each gallon of magnesium chloride in water. Then, 32 grams of powdered magnesium, which is about 0.1 percent of the dry weight of the magnesium oxychloride cement mixture and 100 grams of surfactant (Rohm & Haas X-100) were added to the magnesium oxide component. The surfactant constituted about 0.5 percent of the dry weight of the total mixture. The dry magnesium oxide component was added to the aqueous magnesium chloride component and the mixture immediately began to froth.

EXAMPLE 2

A commercially available fiberboard panel, produced by Kaiser Gypsum Company under the designation "Firtex" was dipped into the frothing mixture produced in Example 1. The panel was maintained in the mixture until thoroughly impregnated. Thereafter, the panel is drained and the magnesium oxychloride cement is permitted to set. Upon evaporation of the water and setting of the cement, the panel was weighed and it was determined that the increase in weight of the panel was 0.1 pound per board foot of panel. After complete cure of the cement, the panels were held in the flame of the butane torch at approximately 1400° F. for 5 minutes. There was no ignition, smoking or smoldering of the treated fiberboard. In contrast, an untreated control sample of fiberboard was subjected to butane flame for 5 seconds and charring, smoking, and finally burning took place. The control panel continued to smolder after removal of the flame and could only be extinguished by smothering in water.

EXAMPLE 3

A commercially available polyurethane foam sponge was introduced into the frothing mixture of Example 1 and held under the surface for 5 seconds. The impregnated sponge was then removed and squeezed to remove the excess frothing mixture so that the sponge did not drip when the squeezing was released. The sponge was then permitted to set and the dry pickup was then measured. It was determined that the sponge picked up 0.1 pounds cement per board foot of foam. The impregnated sponge was held in the flame of a butane torch at approximatey 1400° F. for 5 minutes without any evidence of smoking or flaming.

EXAMPLE 4

Cellulose foam sponge was impregnated with the frothing mixture of Example 1, in the maner outlined in Example 3. The dry pickup of magnesium oxychloride cement was 0.05 pounds cement per square foot of sponge. After the setting of the cement, the panel formed from the celulose sponge was rigid and incompressible by hand pressure. The sponge was unaffected by the flame of a butane torch.

EXAMPLE 5

A low density fireproof building panel was made from commercially available corrugated cardboard having two corrugated sheets, an intermediate flat sheet and two flat facing sheets. A mixture of magnesium oxide composition containing the following ingredients was prepared:
  60% magnesium oxide (40 Min. set)
  36% limestone flour
  1% petroleum wax
  0.5% lactic acid and surfactant
  0.01% magnesium metal powder.

Nine pounds of the magnesium oxide mixture was added to 1 gallon of 22° Baume magnesium chloride brine. The combination began to froth immediately and was used to spray into all of the interstices of the corrugated cardboard. This mixture is considerably less viscous than the cement mixture described in previous examples and completely saturated the corrugated paper. Upon setting of the cement, a fireproof and waterproof board of high strength was obtained. In view of the relatively small amount of cement retained on the cardboard, the density of the product was low as compared to other fireproof products.

It is preferred to place a smooth facing on the fireproof corrugated cardboard by spraying a different magnesium oxychloride cement upon the saturated sheets before the impregnated cement has set. The surface coating may conveniently add silica flour to the composition together with pigments such as titanium dioxide and dye. The filled composition may be sprayed with chopped glass fibers over the corrugated sheets to provide a strong, colored building panel. In place of chopped glass fibers, other fibrous materials such as rice hulls, wood fibers and others may be used.

EXAMPLE 6

Fireproof products according to the present invention may be molded in a desired configuration. Wooden roofing shakes were simulated by forming a mold by vacuum drawing synthetic resin over wooden shakes laid in courses as in roofing. The inside dimensions of the mold were 30 inch × 30 inch and resembled two courses of cedar shakes. Commercially available aqueous magnesium chloride was diluted with water to 22° Baume. For each gallon of this liquid, 15 pounds of magnesium oxide mixture having the following composition was added:

|  | Percent |
|---|---|
| Magnesium oxide (50 min. set) | 37½ |
| Limestone dust - 80 mesh | 30 |
| Limestone dust - 200 mesh | 7 |
| Silica flour | 10 |
| Asbestos fibers | 2½ |
| Diatomaceous silica | 4 |
| Pigment (brown and black) | 1½ |
| Waterproofed vermiculite | 7½ |
| Foaming agent | 0.01 |

The frothing agent mixture was sprayed through an airless spray gun into the mold to completely cover the bottom of the mold. Simultaneously with the spraying of cement, chopped glass fibers were sprayed into the mold in an amount equal to ½ ounce fibers per square foot of mold. Since the bottom of the mold had an irregular surface to resemble the shakes, the frothing cement tended to form in the depressions to a greater extent than on the raised portion, but the mold was completely covered to about one-fourth inch. The rovings had a length from about ¾ inch to about 1½ inch. The fiber glass provides resiliency and strength, so care was taken to make certain that a uniform layer throughout the area of the mold is provided. The mold was variable in depth from about ¼ inch to about 1¼ inch. It was filled with the fibers and cement and permitted to set for 2 hours. After the panel had thoroughly set, it was removed from the mold to give a strong, light-weight panel resembling wooden shakes but was completely fireproof.

The weight of the panel was approximately 15 pounds, and had an average thickness of ½ inch. It could be nailed onto conventional roofing surfaces and was completely incombustible upon heating to 1350° F. For molded product simulating wood, a density of between 30 and 40 pounds per cubic foot should be obtained. For most purposes, a density of 35 pounds per cubic foot is optimum for ease of manufacture and for resembling wood product density.

EXAMPLE 7

In this example, magnesium oxychloride cement with frothing agent is co-foamed with polyurethane foam to make a low-density fireproof product. The magnesium oxychloride cement is prepared in accordance with the examples given above with the exception that 6 pounds of magnesium oxide is added per gallon of 22° Baume magnesium chloride, 0.1% by weight of magnesium powder is added per gallon of 22° Baume magnesium chloride. The oxide and chloride are mixed and the two parts of a standard polyurethane foam are added to the mixture. 60% by weight of the cement mixture is combined with 40% by weight of polyurethane foam prepared by mixing 50% of part A with 50% of part B of two pound density polyurethane foam ingredients commercially available from the CPR Division of Upjohn Corporation, Los Angles, Calif. It is understood that the two parts of the polyurethane foam consists of a polyisocyanate and a polyol, as well as a Freon foaming agent and a catalyst. It is preferred to heat the mixture of cement and polyurethane as it is being mixed initially, but the reaction is exothermic so that continued heating is unnecessary. I have found that mixing is easier and the reaction is quicker where temperatures above 80° F. are maintained. After the cement and urethane components are mixed together, the mixture is placed in containers to make 50 pound buns which are sliced upon completion of the reaction in accordance with the usual practice with polyurethane foam. The final product has a density of approximately four pounds per cubic foot to give a light-weight fireproof product.

EXAMPLE 8

Co-foaming with unexpected polystyrene beads is also possible with the present invention. In this example, precisely the same procedure set forth in Example 7 is followed with the exception that 10% by weight of the total cement and urethane mixture is added of unexpanded polystyrene beads. That is, for each 100 pounds of cement and urethane mixture, 10 pounds of unexpanded styrene beads are added to the mixture before foaming takes place. The heat given off by the formation of the urethane and magnesium oxychloride cement is sufficient to also foam and expand the styrene beads which are mixed thoroughly with the other ingredients to give a light-weight product. This product does not sustain burning, although a butane torch held to the final product will vaporize the expanded beads. Flame will not spread along the surface of the product.

Because of the low cost of magnesium oxychloride cement, foamed products having high durability and strength may economically be produced according to this invention. When the froth is introduced into porous substrates, fireproofing of normally burnable materials is obtained. The cement is conveniently introduced into porous materials to significantly improve their properties.

I claim:

1. An article of manufacture comprising a burnable porous substrate impregnated substantially throughout its cross section with a fireproofing amount of foamed magnesium oxychloride cement formed by mixing aqueous magnesium chloride having a specific gravity of between 21.5° and 22.5° Baume with between 5 and 6.5 pounds magnesium oxide per gallon of aqueous magnesium chloride and a frothing agent reactive with said mixture to produce bubbles, in an amount between 2 and 40% of the weight of the substrate.

2. An article as in claim 1 wherein the substrate comprises cellulose foam sponge.

3. An article as in claim 1 wherein the substrate comprises polyurethane foam.

4. An article as in claim 1 wherein the substrate comprises fiberboard panel.

5. An article as in claim 1 wherein the substrate comprises corrugated cardboard.

6. An article of manufacture comprising glass fibers and a fireproofing amount of foamed magnesium oxychloride cement made by mixing aqueous magnesium chloride having a specific gravity between 21.5° and 22.5° Baume with between 5 and 6.5 pounds magnesium oxide per gallon of aqueous magnesium chloride and a metallic frothing agent reactive with said mixture to produce bubbles, said cement being present in an amount between 2 and 40% of the weight of the glass fibers.

7. An article as in claim 6 comprising a strong, resilient layer of chopped glass fibers thoroughly impregnated with foamed magnesium oxychloride cement containing filler and supporting layers on each side thereof of foamed magnesium oxychloride cement, the density of the article being between 20 and 40 pounds per cubic foot.

* * * * *